(12) United States Patent
Lee et al.

(10) Patent No.: US 11,984,785 B2
(45) Date of Patent: May 14, 2024

(54) IRON-CORE LINEAR MOTOR FORCER WITH INTEGRATED AEROSTATIC BEARING GUIDANCE

(71) Applicant: AKRIBIS SYSTEMS PTE LTD, Singapore (SG)

(72) Inventors: Shien Yang Lee, Singapore (SG); Wei Jie Tan, Singapore (SG)

(73) Assignee: AKRIBIS SYSTEMS PTE LTD, Singapore (SG)

( * ) Notice: Subject to any disclaimer, the term of this patent is extended or adjusted under 35 U.S.C. 154(b) by 322 days.

(21) Appl. No.: 17/623,678

(22) PCT Filed: Jul. 13, 2020

(86) PCT No.: PCT/SG2020/050401
§ 371 (c)(1),
(2) Date: Dec. 29, 2021

(87) PCT Pub. No.: WO2021/015670
PCT Pub. Date: Jan. 28, 2021

(65) Prior Publication Data
US 2022/0278600 A1   Sep. 1, 2022

(30) Foreign Application Priority Data
Jul. 19, 2019 (SG) .......................... 10201906690X

(51) Int. Cl.
*H02K 41/03* (2006.01)
*H02K 3/47* (2006.01)
*H02K 5/16* (2006.01)
*H02K 7/08* (2006.01)

(52) U.S. Cl.
CPC ............. *H02K 41/031* (2013.01); *H02K 3/47* (2013.01); *H02K 5/16* (2013.01); *H02K 7/08* (2013.01)

(58) Field of Classification Search
CPC .......... H02K 41/031; H02K 3/47; H02K 5/16; H02K 7/08
See application file for complete search history.

(56) References Cited

U.S. PATENT DOCUMENTS

| 4,652,148 A | * | 3/1987 | Olasz | F16C 32/067 |
| | | | | 310/90 |
| 4,798,985 A | * | 1/1989 | Chitavat | H02K 41/031 |
| | | | | 310/90 |
| 5,701,041 A | * | 12/1997 | Akutsu | B23Q 1/262 |
| | | | | 248/661 |

(Continued)

Primary Examiner — Robert W Horn
(74) Attorney, Agent, or Firm — WPAT, P.C.

(57) ABSTRACT

An iron-core linear motor forcer (100) with integrated aerostatic bearing guidance is disclosed. The motor forcer (100) comprises
(i) an iron-core (10) enclosed within an enclosure (13) having an upper surface (11) and a bottom surface (12), wherein the iron-core (10) is mounted with a plurality of coil windings (16), and a plurality of air supply channels (50) are provided substantially in vertical from the upper surface (11) to the bottom surface (12) of the enclosure (13), and each of the air supply channels (50) is terminated at the bottom surface (12) with one or more orifices (32); and
(ii) a linear motor stator (20) having a stator surface (22). The iron-core linear motor forcer (100) is frictionless moving on the motor stator (20).

13 Claims, 4 Drawing Sheets

(56) References Cited

U.S. PATENT DOCUMENTS

| | | | |
|---|---|---|---|
| 6,212,935 B1* | 4/2001 | Shiozaki | B23Q 1/70 |
| | | | 73/9 |
| 6,753,626 B2* | 6/2004 | Hwang | H02K 41/03 |
| | | | 310/12.26 |
| 9,362,810 B2* | 6/2016 | Ebi | H02K 41/02 |
| 2006/0049700 A1* | 3/2006 | Moriyama | G03F 7/70758 |
| | | | 310/12.06 |
| 2022/0278600 A1* | 9/2022 | Lee | H02K 5/16 |

* cited by examiner

IRON-CORE LINEAR MOTOR FORCER WITH INTEGRATED AEROSTATIC BEARING GUIDANCE

CROSS REFERENCE TO RELATED APPLICATIONS

This patent application claims the benefit of Singapore Provisional Application No. 10201906690X filed 19 Jul. 2019. The above application are incorporated by reference herein.

FIELD OF THE INVENTION

The present disclosure relates generally to aerostatic bearing guidance. More particularly, the present disclosure relates iron-core linear motor forcer with integrated aerostatic bearing guidance to form a modular unit that self-regulates the running clearance between the forcer and the stator of the linear motor.

BACKGROUND OF THE INVENTION

It is known in conventional technology that magnetic attraction force between a forcer and stator of an open-faced iron-core linear motors can be used as a source of preload for aerostatic bearings. This has been disclosed in U.S. Pat. No. 6,150,740, which discloses a system and method of preloading linear motion bearings arranged to move between two orthogonal surfaces of each of a rail and an overlapping carriage, wherein a permanent magnet linear electric motor with a high attractive force between the coils and the magnets is inclined at an acute angle to the surfaces, to create non-contact linear motion axes. However, the existing arts are based on combining standalone aerostatic bearing elements with iron-core linear motors in an assembly. In such a design, a preload force is applied at a different location than the bearing air film, and the motor acceleration applies forces away from the center-of-stiffness of each bearing element, thereby requiring careful mechanical design to achieve favourable system dynamics and high geometric accuracy.

German Patent No. DE102007057833 discloses a linear guide with integrated linear motor having a fixed, in the guide direction extending support, a guide in the direction movable table and a linear motor whose movable part is with the table and its stationary part is connected to the carrier. The linear guide also has an integrated position measuring system with a scale and scanning heads, with the position of the table both in the guide direction and in a deviation direction is detectable, the transversely to the guide direction and parallel to a plane of an air gap of the linear motor.

U.S. Pat. No. 6,707,200 discloses an integrated motor and magnetic bearing, comprising: a rotor comprising a plurality of permanent magnets; and a stator comprising a plurality of independently controlled coil segments magnetically coupled to the permanent magnets. The motor segments adapted to produce tangential forces thereto, thereby producing both torque and bearing forces on the stator and the rotor from the tangential forces.

EP 3460273 discloses an active aerostatic bearing which comprises a lower plate with a central recess area including an orifice forming an inlet restrictor for pressurized air from a central nozzle. An air gap is formed between a guiding surface and the lower plate. The active aerostatic bearing comprises a force actuator acting to deform the lower plate and thus changing the shape of the air gap. The actuator causes a conical deformation of the first plate. Preferably, the first plate, a second plate and four pivoting points are forming a parallelogram, the shape of the parallelogram being changeable by actuating the actuator.

SUMMARY OF THE PRESENT INVENTION

A main object of the present invention is to provide an iron-core linear motor forcer with integrated aerostatic bearing guidance, such that the bearing element, preloading element, and actuation element are combined into a single unit. Such a combined unit produces a self-contained motion element with inherent alignment between the inertial center, the stiffness center, and the force center. These inherently balanced elements are easy to integrate into systems, reduce overall part count, and have reduced mass and size—all characteristics that contribute to significant potential utility in the construction of precision motion systems.

Another main object of the present invention is to provide an iron-core linear motor forcer with integrated aerostatic bearing guidance comprising
(i) an iron-core enclosed within an enclosure having an upper surface and a bottom surface, wherein the iron-core is mounted with a plurality of coil windings, and a plurality of air supply channels are provided substantially in vertical from the upper surface to the bottom surface of the enclosure, and each of the air supply channels is terminated at the bottom surface with one or more orifice; and
(ii) a linear motor stator having a stator surface;
thereby a pressurized air being injected via the plurality of the air supply channels and through the orifices into a magnetic air gap formed between the bottom surface and the stator surface of the motor stator in creating a preloaded load-bearing air film, and the iron-core linear motor forcer is frictionless moving on the motor stator.

Yet another main object of the present invention is to provide an iron-core linear motor forcer with integrated aerostatic bearing guidance comprising
(i) an iron core enclosed within an enclosure having an upper surface and a bottom surface, wherein the iron-core is mounted with a plurality of coil windings;
(ii) a plurality of hypodermic tubings each having an internal volume, mounted on the bottom surface and a plurality of orifices formed between the internal volume of the hypodermic tubings and the bottom surface; and
(iii) a linear motor stator having a stator surface;
thereby a pressurized air being injected via the hypodermic tubings into a magnetic air gap formed between the top bottom surface and the stator surface to create a preloaded load-bearing air film, and the iron-core linear motor forcer is frictionless moving on the motor stator.

Yet still a further object of the present invention is to provide an iron-core linear forcer with integrated aerostatic guidance, wherein the plurality of orifices on the hypodermic tubing on the bottom surface of the linear motor forcer are formed by a laser device or the like.

Another object of the present invention is to provide an iron-core linear motor forcer with integrated aerostatic bearing guidance, wherein the hypodermic tubing is mounted below the bottom surface of the iron core.

Yet still another object of the present invention is to provide an iron-core linear motor forcer with integrated aerostatic bearing guidance, wherein the top abrasion resistant layer and the bottom abrasion resistant layer are of a high level of flatness.

Yet another object of the present invention is to provide an iron-core linear motor forcer with integrated aerostatic bearing guidance, wherein the linear motor stator contains an array of permanent magnets, and the forcer moves in relation to the linear motor stator, and the stator surface of the linear motor stator is of a high level of flatness and finish.

Still yet another object of the present invention is to provide an iron-core linear motor forcer with integrated aerostatic bearing guidance, wherein the surface of the linear motor stator is acting as a guideway for the iron core forcer.

Another object of the present invention is to provide an iron-core linear motor forcer with integrated aerostatic bearing guidance, wherein the top surface linear motor stator and the bottom surface are used as running surfaces of the aerostatic bearing. Between these two surfaces is an air film preloaded by the magnetic attraction between forcer and stator, with thickness preferably between 0.1 micrometers and 100 micrometers.

Yet a further object of the present invention is to provide an iron-core linear motor forcer with integrated aerostatic bearing guidance, wherein an interstitial preloaded air film or an air gap film is provided between the linear motor stator and the bottom surface of the forcer so as to allow the linear motor to run at an appropriate magnetic-air gap height.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION OF A PREFERRED EMBODIMENT

The following is intended to provide a detailed description of an example of the invention and should not be taken to be limiting of the invention itself. Rather, any number of variations may fall within the scope of the invention which is defined in the claims following the description.

Figure 1:
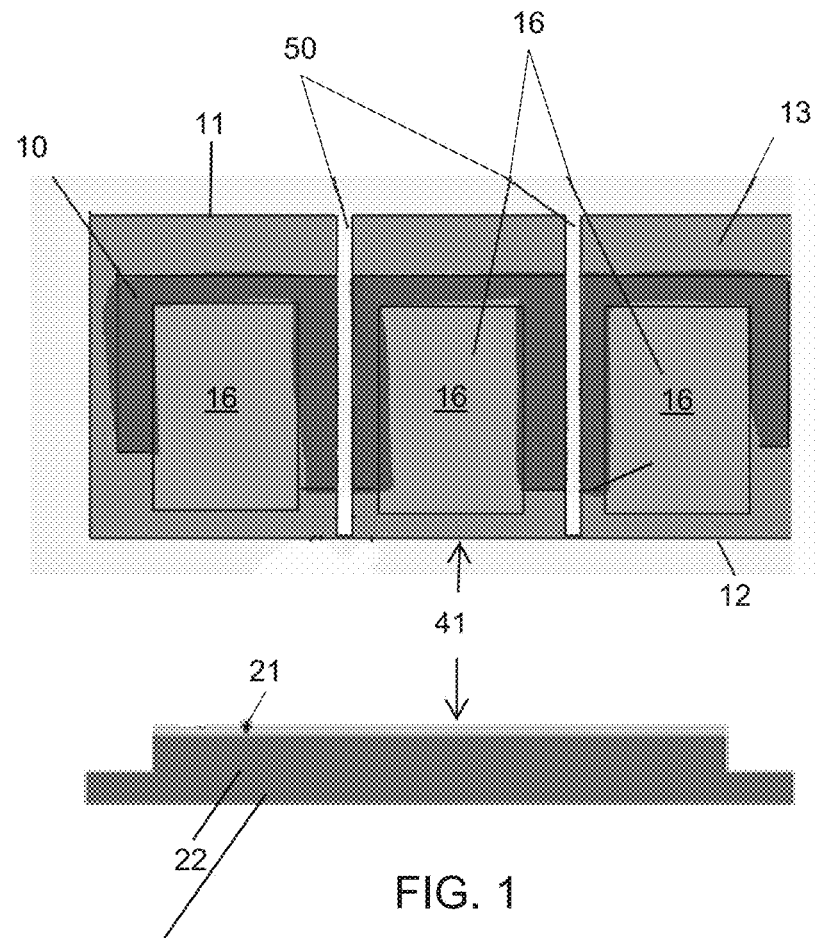
FIG. 1 is a sectional view of an iron-core linear motor forcer with integrated aerostatic bearing of a first preferred embodiment in accordance with the present invention, wherein a plurality of air supply channels are formed on the forcer for injecting pressurized air into the magnetic air gap of the iron-core linear motor.
Figure 1A:
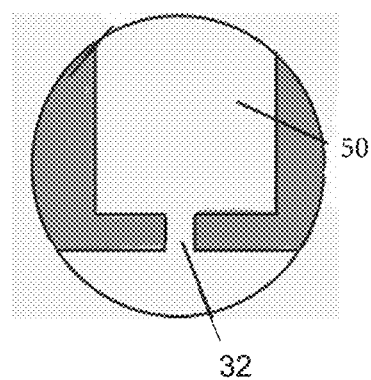
FIG. 1A is a sectional view illustrating the orifice of the air supply channels in accordance with the present invention.

FIG. 1 is a sectional view of an iron-core linear motor forcer (100) with integrated aerostatic bearing of a first preferred embodiment in accordance with the present invention, wherein a plurality of air supply channels (50) are formed on the forcer (100) for injecting pressurized air into the magnetic air gap of the iron-core linear motor. In accordance with the preferred embodiment, the iron-core linear motor forcer (100) with integrated aerostatic bearing guidance comprises (i) an iron-core (10) enclosed within an enclosure; and (ii) a linear motor stator (20) having a stator surface. The iron-core (10) is mounted within the enclosure (13) having a top surface (11) and a bottom surface (12). A plurality of coil windings (16) are mounted onto the iron-core (10), wherein a plurality of air supply channels (50) are provided substantially in vertical from the top surface (11) to the bottom surface (12) of the enclosure (13). Each of the air supply channels (50) is terminated at the bottom surface (12) with one or more orifices (32), which is shown in FIG. 1A, which is a figure illustrating the orifice (32) of the air supply channels (50) in accordance with the present invention. A supply of a pressurized air is injected via the plurality of the air supply channels (50) into a magnetic air gap formed between the bottom surface (12) of the forcer (100) and the stator surface (22) of the motor stator (20) in creating a preloaded load-bearing air film (41). The iron-core (10) linear motor forcer (100) is frictionless moving on the motor stator (20).

Figure 2:
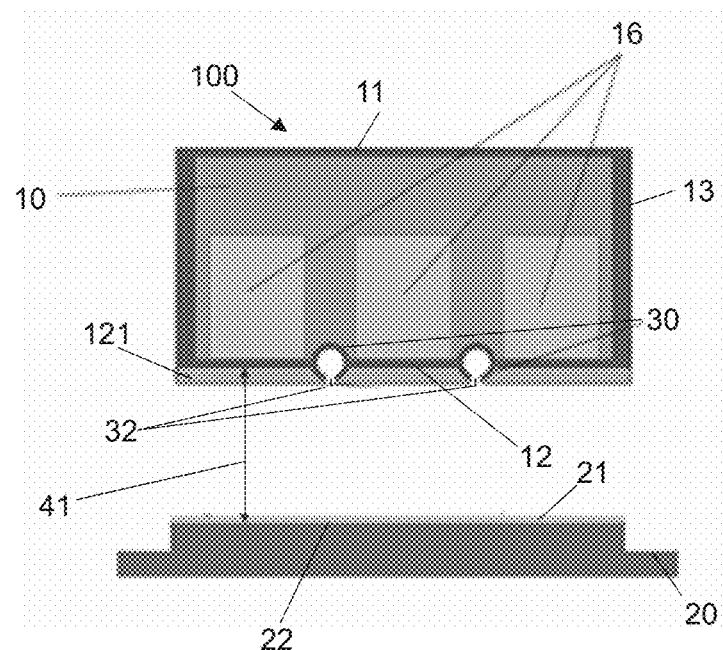
FIG. 2 is a sectional view of an iron-core linear motor forcer with integrated aerostatic bearing of a second preferred embodiment in accordance with the present invention, wherein a plurality of hypodermic tubings are mounted on the bottom surface of the forcer for injecting pressurized air into the magnetic air gap of the iron-core linear motor.

FIG. 2 shows a sectional view of an iron-core linear motor forcer with integrated aerostatic bearing of a second preferred embodiment in accordance with the present invention, wherein a plurality of hypodermic tubings are mounted on the bottom surface of the forcer for injecting pressurized air into the magnetic air gap of the iron-core linear motor. The iron-core linear motor forcer (100) comprises an iron core (10); a plurality of coil windings (16); a plurality of hypodermic tubings (30), each having an internal volume, being mounted beneath the bottom surface (12) of the iron core (10). The iron core (10) is enclosed within an enclosure (13) and is provided with a top surface (11) and a bottom surface (12), and the iron-core (10) is mounted with a plurality of coil windings (16). The plurality of hypodermic tubings (30) are located on the bottom surface (12) of the iron-core (10) and each of the hypodermic tubings (30) is individually terminated to form an orifice (32) on the bottom surface (12). The linear motor stator (20) has a stator surface (22) which is of a high level of flatness and finish. In this preferred embodiment, a pressurized air is being injected via the hypodermic tubings (30) into a magnetic air gap formed between the bottom surface (12) and the stator surface (22) to create a preloaded load-bearing air film (41), and the iron-core (10) is frictionless moving on the motor stator (20).

In another preferred embodiment, a top abrasion resistant layer (121) can be mounted onto the bottom surface (12) of the iron-core (10) and a bottom abrasion resistant layer (21) can be mounted onto the stator surface (22) of the linear motor stator (20). Both the top abrasion resistant layer (121) and the bottom abrasion resistant layer (21) are finished to a high level of flatness and finish to act as the aerostatic bearing surface. The plurality of orifices (32) connect the internal volume of the hypodermic tubings (30) with the bottom surface (12) of the forcer (100).

The orifices (32) connect the hypodermic tubing (30) to the aerostatic bearing air film (41), and the orifices (32) of the hypodermic tubing (30) on the bottom surface (12) of the iron core (10) are formed by a laser device or the like.

As shown in FIGS. 1 and 2, a plurality of coil windings (16) are embedded within the iron core (10), and the iron core (10) is enclosed by the enclosure (13). The enclosure (13) is made from a polymer material. The hypodermic tubing (30) is mounted below the bottom surface of the iron core (10).

The top abrasion resistant layer (121) and the bottom abrasion resistant layer (21) are of a high level of flatness in accordance with the preferred embodiment of the present invention.

In operation, the linear motor forcer (100) moves in relation to the linear motor stator (20) containing an array of permanent magnets. The stator surface of the stator (20), opposite to the aerostatic bearing layer (41) on the forcer (100), is similarly finished to a high level of flatness and finish to act as the guideway for the iron-core forcer with integrated aerostatic bearing. The geometric accuracy of the guided forcer's trajectory depends on the degree of planarity of the opposed bearing surfaces (12, 22) on the forcer (100) and the stator (20) respectively.

In the preferred embodiments illustrated in FIGS. 1 and 2, these precision surfaces (12, 22) are created by polymer replication against a precision finished master. To confer favourable dry-running properties, polymer mixtures designed for replication of plain bearing surfaces are used. The aerostatic bearing and guideway surfaces prepared through other means, such as by grinding, lapping, polishing, etc constitute alternative embodiments of the present invention.

Figure 3:
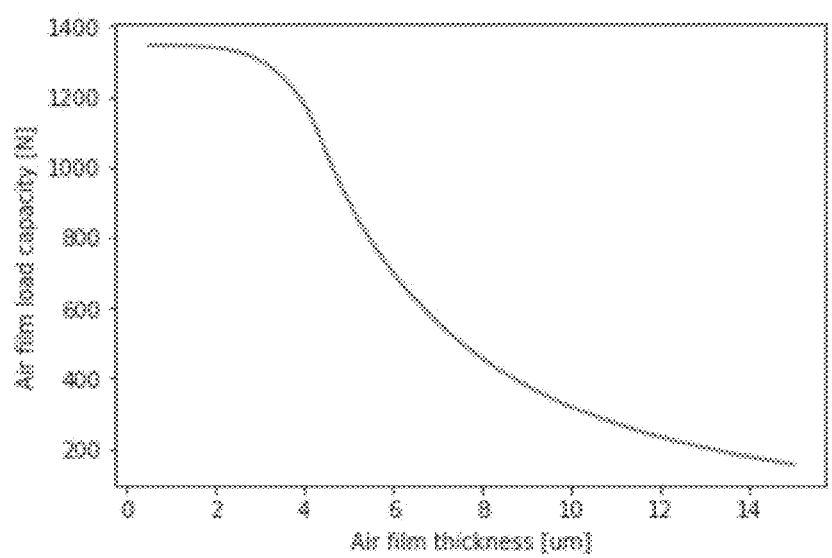
FIG. 3 is a graph showing air film load capacity against film thickness for an orifice-compensated thrust aerostatic bearing in accordance with the present invention.

FIG. 3 is a graph showing air film load capacity against film thickness for an orifice-compensated thrust aerostatic bearing in accordance with another with the present invention. For a particular aerostatic bearing design, the thickness of the air film is determined by the magnitude of the force acting to compress the air film. In certain precision motion applications, it is desirable to operate the aerostatic bearing at a range of air film with thicknesses corresponding to high stiffness.

In accordance with the present invention, the iron-core linear motor forcer with integrated aerostatic bearing guidance is properly designed to maximize stiffness and geometric accuracy of the aerostatic bearing so as to achieve high levels of geometric accuracy and motion repeatability at lower cost than conventional motion stage designs.

By comparing to motion stages based on standalone linear motors and bearings, the iron-core linear motor forcer with integrated aerostatic bearing guidance can achieve smaller sizes by efficiently utilizing the magnetic air gap volume that goes unused conventionally. The integration of aerostatic bearings and actuators into a single modular unit also reduces part count of a unit and costs compared to standalone designs. As mentioned above, tight integration between coil winding and the aerostatic bearings also inherently aligns inertial, stiffness, and force centers, leading to improved dynamic performance.

Figure 4:
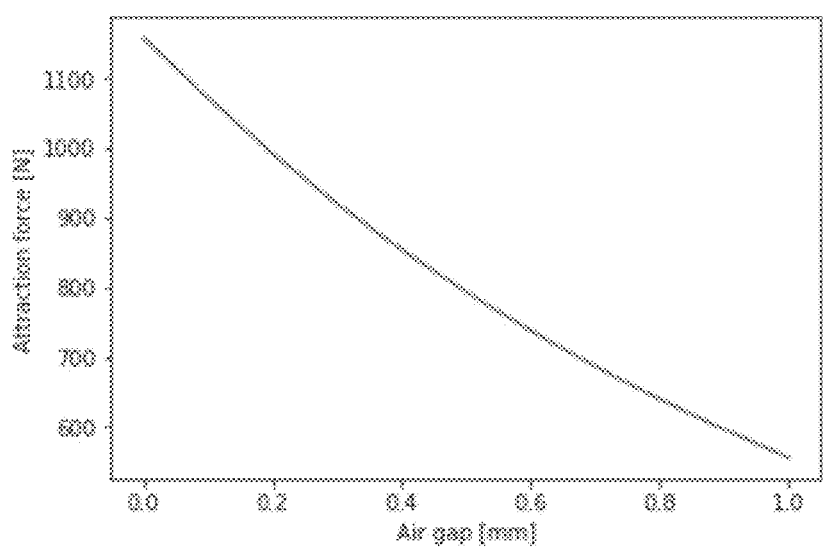
FIG. 4 is a graph showing stator-forcer attraction force against air gap of an iron-core linear motor in accordance with the present invention.

FIG. 4 is a graph showing stator-forcer attraction force against magnetic air gap of an iron-core linear motor in accordance with the present invention. For a particular linear motor design, the magnitude of the attractive force between the forcer and the stator depends on the distance therebetween. Such a distance is known as the magnetic air gap and has implications on the motor's performance characteristics such as its force constant. For a certain linear motor design, there is a range of preferable magnetic air gaps.

The present invention allows the geometric relationship between the magnetic air gap and the air film thickness to be determined during the manufacturing process which is easily carried out under controlled conditions. This represents an improvement over the state of the art which relies on precision machining and careful assembly to set the magnetic air gap of linear motors. In the present invention, the magnitude of the bearing air film thickness self-regulates.

This is due to a static force balance between the load capacity of the air film and the magnetic attraction force between the forcer iron core and the permanent magnets in the stator (20). The magnetic attraction force varies approximately quadratically as a function of the distance between the stator (20) and the forcer iron core (10) as shown in FIG. 4, while the air film load carrying capacity varies in the characteristic non-linear manner illustrated in FIG. 3. The equilibrium air film thickness is set by selecting an appropriate distance between the forcer iron-core (10) and the forcer bottom surface (12). Depending on design goals, the equilibrium air film can be freely set at different thicknesses (e.g. for maximal stiffness, for vibration isolation etc.). This self-regulating property significantly simplifies the assembly of motion stages as it eliminates the need to independently and precisely set the distance between magnetic preloading elements as well as between air bearing elements.

Finally, directly utilizing the stator (20) and forcer surfaces as air bearing running surfaces allows the linear motor to run at smaller magnetic air gaps than practical with conventional designs with standalone motors and bearings due to the difficulty of ensuring parallelism and consistent forcer-stator distance over the full stroke of the stage.

In accordance with the preferred embodiments of the present invention, any waviness in the iron-core linear motor forcer (100) and the stator (20) running surfaces cause corresponding geometric errors in the forcer trajectory while the air film (41) thickness and magnetic air gap is conserved. This characteristic prevents unwanted forcer-stator collisions. Decreasing the thinnest feasible magnetic air gap increases design freedom for motor design, potentially contributing to linear motors with higher efficiency or force density.

Although preferred embodiments of the present invention have been described above by way of example only, it will be understood by those skilled in the field that modifications may be made to the disclosed embodiments without departing from the scope of the invention, which is defined by the appended claims.

The invention claimed is:

1. An iron-core linear motor forcer (100) with integrated aerostatic bearing guidance comprising
   (i) an iron-core (10) enclosed within an enclosure (13) having an upper surface (11) and a bottom surface (12), wherein the iron-core (10) is mounted with a plurality of coil windings (16), and a plurality of air supply channels (50) are provided substantially in vertical from the upper surface (11) to the bottom surface (12) of the enclosure (13), and each of the air supply channels (50) is terminated at the bottom surface (12) with one or more orifices (32); and
   (ii) a linear motor stator (20) having a stator surface (22); thereby a pressurized air being injected via the plurality of the air supply channels (50) into a magnetic air gap formed between the bottom surface (12) and the stator surface (22) of the motor stator (20) in creating a preloaded load-bearing air film (41), and the iron-core linear motor forcer (100) is frictionless moving on the motor stator (20).

2. The iron-core linear motor forcer (100) as set forth in claim 1, wherein the bottom surface (12) of the forcer (100) and the stator surface (22) are of a high level of flatness.

3. An iron-core linear motor forcer (100) with integrated aerostatic bearing guidance comprising
   (i) an iron core (10) enclosed within an enclosure (13) having an upper surface (11) and a bottom surface (12), wherein the iron-core (10) is mounted with a plurality of coil windings (16;
   (ii) a plurality of hypodermic tubings (30) each having an internal volume, mounted on the bottom surface (12) and a plurality of orifices (32) connecting the internal volumes of the hypodermic tubings (30) with the bottom surface (12); and
   (iii) a linear motor stator (20) having a stator surface (22); thereby a pressurized air being injected via the hypodermic tubings (30) into a magnetic air gap formed between the forcer bottom surface (12) and the stator surface (22) to create a preloaded load-bearing air film (41) in the magnetic air gap of the linear motor stator, and the iron-core linear motor forcer (100) is frictionless moving on the motor stator (20).

4. The iron-core linear motor forcer (100) as set forth in claim 1, wherein the wherein the stator (20) contains an array of permanent magnets, and the iron core (10) moves in relation to the stator (20).

5. The iron-core linear motor forcer (100) as set forth in claim 1, wherein the stator surface (22) of the linear motor stator (20) and the bottom surface (12) are used as a running surface of the aerostatic bearing, and the thickness of the bearing air film (41) is between 0.1 micrometer to 100 micrometer.

6. The iron-core linear motor forcer (100) as set forth in claim 1, wherein the interstitial preloaded air film (41) is provided between the linear motor stator (20) and the bottom surface (12) of the forcer (100) running as to allow the linear motor to run at a desired magnetic air gap.

7. The iron-core linear motor forcer (100) as set forth in claim 1, wherein the stator surface (22) of the stator (20) is of a high level of flatness and finish.

8. The iron-core linear motor forcer (100) as set forth in claim 7, wherein the stator surface of the linear motor stator (20) is acting as a guideway for the iron core forcer (100).

9. The iron-core linear motor forcer (100) as set forth in claim 1, wherein the air supply channels (50) are formed on the iron-core (10) by drilling, machining or the like process.

10. The iron-core linear motor forcer (100) as set forth in claim 9, wherein the plurality of air supply channels (50) are disposed in the body of the iron-cone linear motor forcer (100).

11. The iron-core linear motor forcer (100) as set forth in claim 1, wherein the air within the supply channels (50) are compressed and released into the magnetic air gap between the bottom surface (12) and the stator surface (22) of the motor stator (20).

12. The iron-core linear motor forcer (100) as set forth in claim 3, further comprising a top abrasion resistant layer (121) on the bottom surface (12) and a bottom abrasion resistant layer (21) on the stator surface (22).

13. The iron-core linear motor forcer (100) as set forth in claim 3, wherein the plurality of orifices (32) on the hypodermic tubing (30) on the bottom surface (12) are formed by a laser device.

* * * * *